United States Patent [19]
Kent

[11] Patent Number: 5,127,638
[45] Date of Patent: Jul. 7, 1992

[54] APPARATUS FOR REMOVING WHEEL HUBS FROM VEHICLE AXLES

[76] Inventor: Cloyce G. Kent, 1821 Regina Ave., Lincoln Park, Mich. 48146

[21] Appl. No.: 667,350

[22] Filed: Mar. 11, 1991

[51] Int. Cl.⁵ ............................................. B66F 3/00
[52] U.S. Cl. ............................. 269/17; 254/133 R
[58] Field of Search .............. 254/2 R, 2 B, 133, 134, 254/94, DIG. 4, DIG. 16; 29/273; 269/17

[56] References Cited
U.S. PATENT DOCUMENTS

| | | | |
|---|---|---|---|
| 2,543,264 | 2/1951 | Abbey | 254/133 R |
| 3,012,311 | 12/1961 | Shupe | 254/134 |
| 4,549,722 | 10/1985 | Gagliano | 254/134 |
| 4,645,181 | 2/1987 | Schapansky | 254/2 B |

*Primary Examiner*—Robert C. Watson
*Attorney, Agent, or Firm*—Lawrence J. Shurupoff

[57] ABSTRACT

An apparatus which is mountable on a mechanic's dolly or fork lift includes a support plate which is bolted to the studs of a vehicle wheel hub for removing, repairing and/or replacing a vehicle wheel hub. The apparatus is fitted with adjustable tubular sockets for receiving varying spaced lift forks.

14 Claims, 2 Drawing Sheets

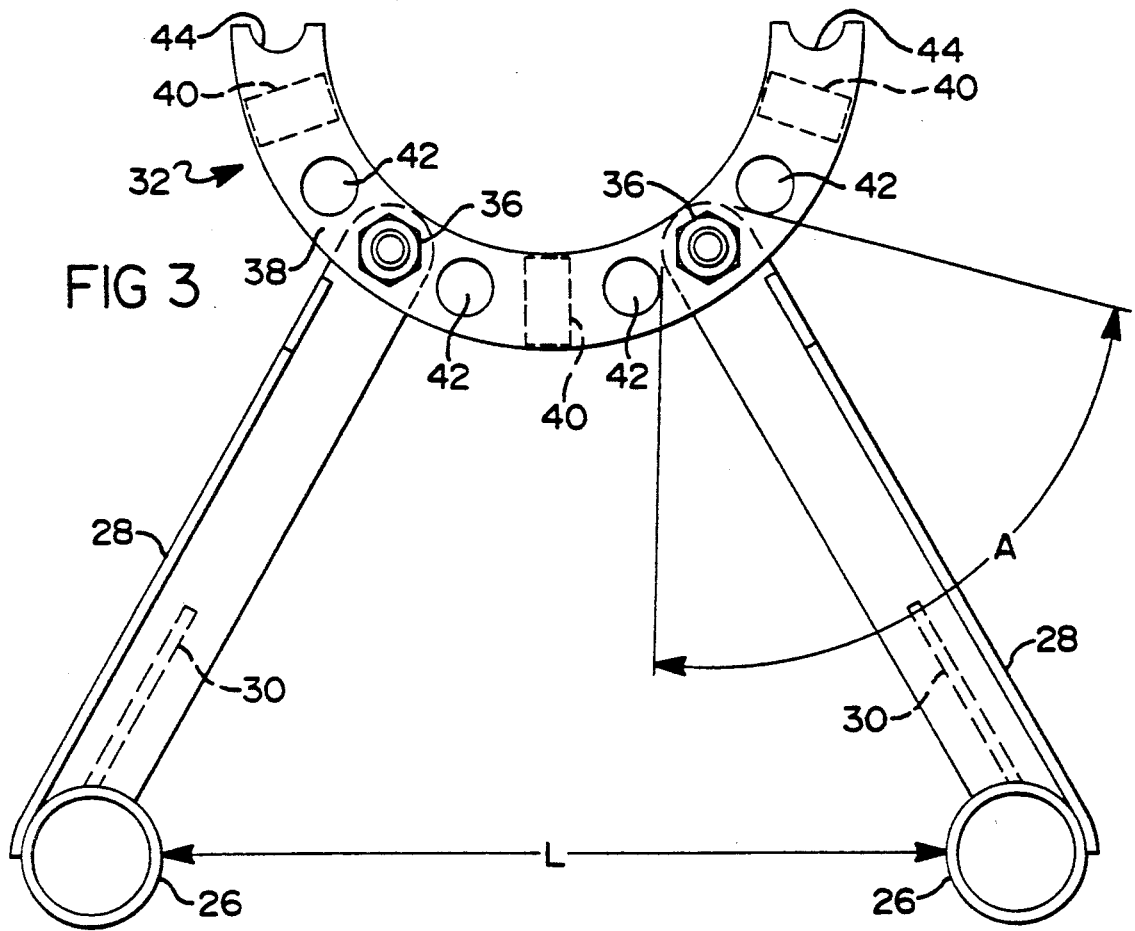
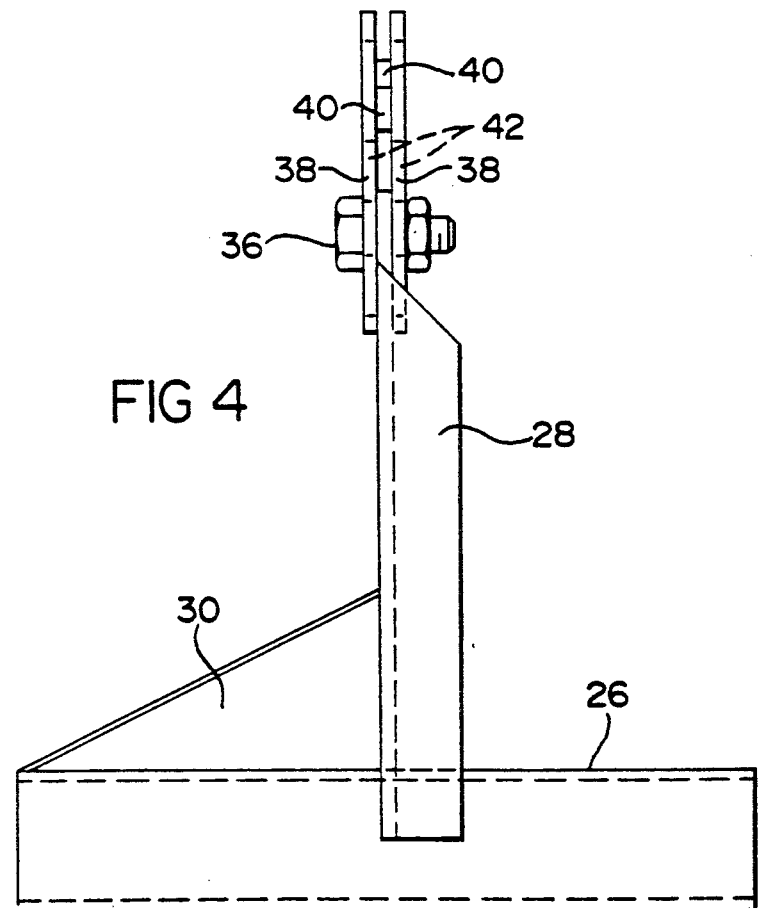

APPARATUS FOR REMOVING WHEEL HUBS FROM VEHICLE AXLES

BACKGROUND OF THE INVENTION

1. Field of the Invention

The present invention relates in general to vehicle wheel and brake repair and particularly relates to a fixture for supporting and holding a wheel hub and, if present, the accompanying brake rotor assembly during removal, repair and/or reinstallation of the wheel hub.

2. Description of Prior Developments

In order to repair or replace the wheel bearings, wheel bearing seals and/or the brake rotor assemblies from medium to large sized vehicles such as delivery trucks and the like, mechanics must first remove the wheel hub from its axle.

As used herein, the term hub assembly is meant to encompass vehicle wheel hubs both with and without attached brake rotors. In those vehicles fitted with disc brakes, the brake rotor disc is generally attached to the wheel hub so that removal and repair of the disc brake requires removal of the wheel hub as well. Unfortunately, such hub and rotor assemblies are relatively heavy, cumbersome and generally difficult to remove, replace and manipulate.

It has been a customary requirement for two mechanics or repairmen to remove and replace such hub assemblies due to their large size and weight. That is, once a vehicle has been jacked up and its tires removed, one mechanic would stand in front of the exposed hub assembly and another mechanic would stand to the rear and together they would pull the hub assembly from its axle and lower the hub assembly to the ground. It can be appreciated that due to the heavy weight of these hub assemblies, back injuries and crushed fingers and toes were not uncommonly experienced during such operations.

After lowering the hub assembly to the ground, one mechanic would hold the hub assembly and prevent it from rolling around on the shop floor while the other mechanic would knock or hammer out the wheel bearings and wheel bearing seals which were typically press fit within the hub assembly. During such procedures, the hub assembly would frequently become soiled from the dirt and debris typically covering the shop floor. This would necessitate subsequent removal of the dirt prior to reinstallation of the hub assembly on its axle.

Another problem associated with the aforementioned hub assembly removal procedure is the frequent occurrence of damage to the wheel bearing seals. Such seals are generally formed with delicate, thin-sectioned elastomeric seal lips. During the forceful pulling and pushing required to remove and install the hub assembly, the hub assembly would often be skewed at an angle to the axis of the wheel axle thereby placing extreme loads on the bearing seals. Such loads often scratched or tore the seal lip material thereby rendering the seal useless and requiring its replacement.

Accordingly, a need exists for an apparatus or fixture which allows a single operator or mechanic to quickly and with little effort remove, support, repair and replace the hub assembly of a vehicle such as found on medium and heavy duty trucks.

SUMMARY OF THE INVENTION

The present invention has been developed to fulfill the needs noted above and therefore has as an object the provision of an apparatus for safely and securely engaging and supporting a vehicle wheel hub assembly during its removal, repair and/or reinstallation.

Another object of the invention is the provision of an economical wheel hub assembly support fixture which may be adjusted and adapted for use with virtually any commercially available wheeled dolly or forked lifting device.

Another object of the invention is the provision of an apparatus which will allow a single worker or mechanic to remove, repair and replace a vehicle wheel hub assembly in less time than it presently takes two workers or mechanics to complete the same tasks.

Still another object of the invention is to provide an apparatus which will reduce the incidence of injuries arising from the removal and replacement of vehicle wheel hub assemblies.

Yet another object of the invention is to provide an apparatus which will prevent damage to wheel bearings seals during their removal from an axle.

Another object of the invention is the provision of an apparatus which virtually eliminates all strenuous physical tasks heretofore associated with the removal and replacement of vehicle wheel hub assemblies. Such tasks include lowering, holding and lifting the heavy wheel hub assemblies.

Briefly, the present invention is directed to an adjustable support fixture which may be fixed securely to a vehicle wheel hub via the wheel studs and wheel nuts normally used to secure a tire and wheel to the wheel hub. The support fixture includes a pair of tubular socket members within which a pair of conventional lifting forks may be inserted. The lifting forks may be mounted on any one of many commercially available lifting and carrying dollies commonly used in the vehicle repair field.

A reinforced arm is securely attached to each socket member. A support plate, provided with one or more apertures dimensioned to receive the wheel studs, is connected to each reinforced arm. Each arm may be pivotally and removably attached to the support plate thereby allowing the spacing between the reinforced arms and the tubular sockets to be adjusted. In this manner, the spacing between tubular sockets may be adjusted to receive virtually any pair of wheel dolly forks or fork lift forks.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 3 is a front elevation view of the wheel hub support apparatus of FIG. 1; and FIG. 4 is a side elevation view of FIG. 3.

In the various figures of the drawing, like reference characters designate like parts.

DETAILED DESCRIPTION OF THE PREFERRED EMBODIMENTS

Figure 1:
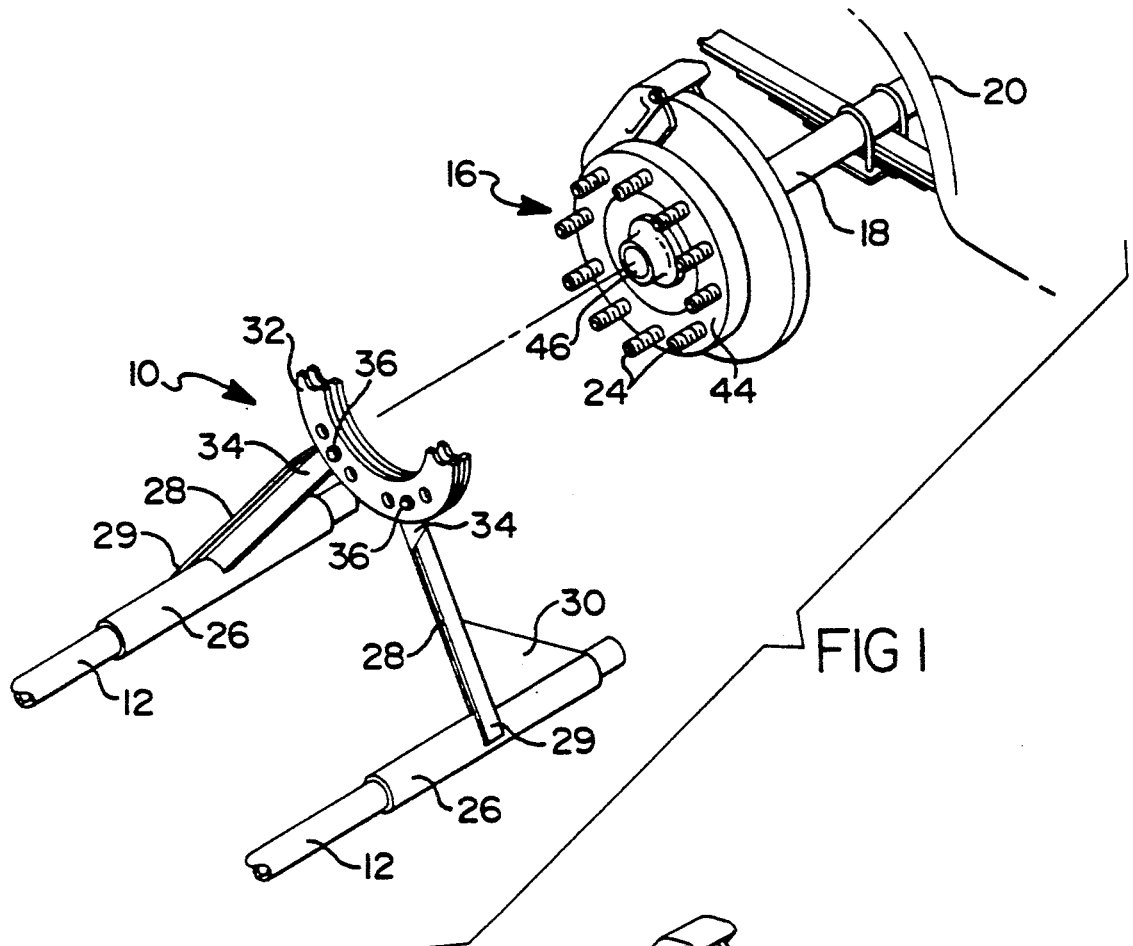
FIG. 1 is a schematic, partially sectioned, perspective view of a wheel hub assembly mounted to a vehicle axle and showing a wheel hub support apparatus according to the invention.
Figure 2:
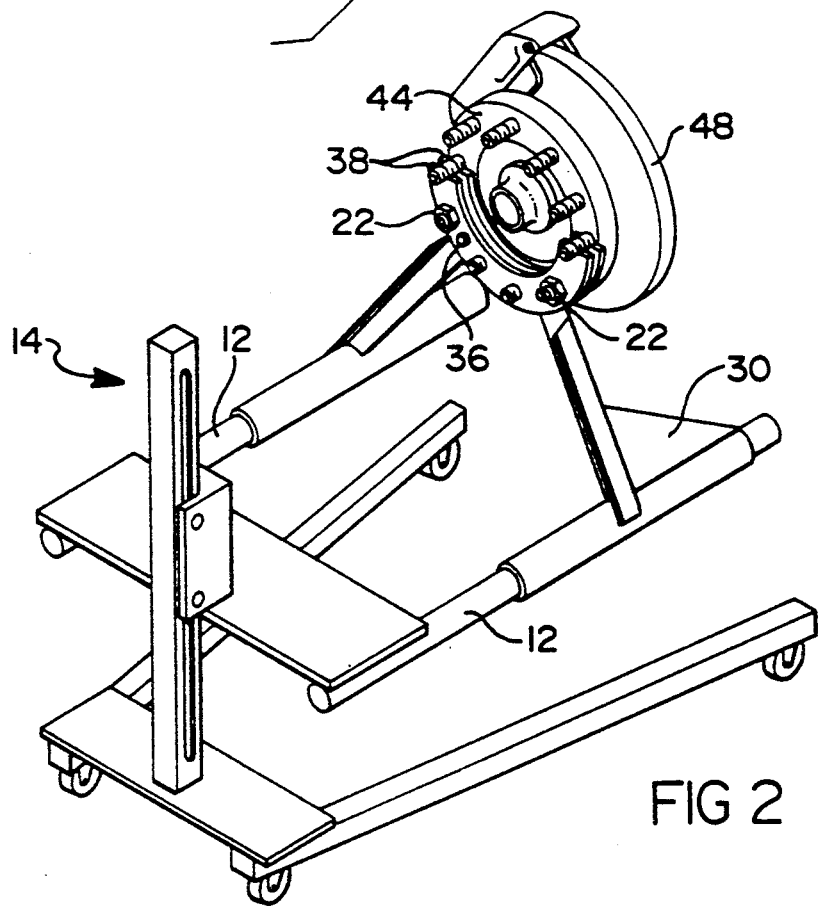
FIG. 2 is a perspective view of the wheel hub support apparatus of FIG. 1 mounted to the forks of a wheeled dolly and supporting the wheel hub assembly of FIG. 1.

The present invention will now be described in conjunction with the drawing, beginning with FIG. 1 which shows a wheel hub support apparatus 10 mounted on the forks 12 of any suitable forked lifting machine such as the wheeled dolly 14 shown in FIG. 2. As further seen in FIG. 1, a vehicle wheel hub assembly 16 is mounted to the axle 18 of vehicle 20 in a known fashion. Although not shown, vehicle 20 is preferably supported by a jack so that the hub assembly 16 is elevated from the ground.

In order to remove the hub assembly 16 from vehicle 20, all wheel nuts 22 (FIG. 2) have been removed from the wheel studs 24. The wheel and its tire (not shown) have been pulled away from and off of the studs 24 and thereby removed from vehicle 20. Thus, as seen in FIG. 1, the hub assembly 16 is ready for receiving the wheel hub support apparatus 10 as described in more detail below.

Wheel hub support apparatus 10 includes a pair of parallel tubular socket or fork engagement members 26 which may take the form of readily available 2½ inch I.D. steel pipe. Each socket member 26 may have a length of about 1 to 3 feet. Each one of a pair of support arms 28,28 has one end portion 29 rigidly fixed to each socket member 26 such as by welding. Support arms 28 may be cut from any suitable steel stock such as 2"×2"×¼"angle stock. A triangular brace plate 30 may be welded to each support arm 28 and to each socket member 26 for increasing the support strength and rigidity of support apparatus 10.

A support plate 32 is mounted to the other end portion 34 of each support arm 28, preferably with threaded fasteners 36, such as nuts and bolts. Such an adjustably clamped connection allows each arm 28 to be pivotally adjusted through, for example, arc A shown in FIG. 3 by loosening the clamped connection, moving arms 28 then reclamping the arms to plate 32 with fasteners 36. It can be appreciated that by pivoting arms 28 about their mounting fasteners 36, the distance L between the socket members 26 may be adjusted to mate with and receive the forks 12 of various lifting machines having different fork spacings.

As seen in FIGS. 3 and 4, support plate 32 may be fabricated from a pair of semi-circular C-shaped brace plates 38,38. Brace plates 38,38 are preferably separated by circumferentially spaced spacer members such as metal shim plates 40. Shim plates 40 may be welded between the brace plates so as to unitize the brace plates. By separating the brace plates 38 in this manner, additional support is provided to the wheel hub assembly 16 by reducing the bending loads applied to the wheel studs 24 when the wheel hub assembly is supported by support apparatus 10.

A series of circumferentially spaced and coaxially aligned through holes 42 are formed through each brace plate 38 for allowing the wheel studs 24 to pass through each brace plate. The pattern of holes 32 is selected to match the stud pattern on the type of wheel hub to be supported. As seen in FIG. 3, the hole pattern is located along a generally circular arc. One common stud pattern which may be selected is known as a type 10 Budd wheel stud pattern which is found on many commercial trucks. As seen in FIG. 1, the stud pattern is generally circular.

It is of course possible to form arcuate slots in place of circular holes 42 so that a greater variety of wheel stud patterns may be received through the brace plates 38. Semi-cylindrical recesses 44 may be formed on the free end portions 46 of each brace plate 38 to supportingly engage the wheel studs 24 to provide increased support to the wheel hub assembly 16.

The application of the support apparatus 10 to a vehicle wheel hub assembly 16 begins with the removal of the vehicle wheel and tire from wheel studs 24 and the placement of support plate 32 over wheel studs 24 via through holes 42. As seen in FIG. 2, the wheel nuts 22 which were removed from wheel studs 24 are used to securely bolt or fasten support plate 32, along with the entire support apparatus 10, to the front face 44 of wheel hub assembly 16. Referring now back to FIG. 1, the wheel axle nut (not shown) housed within recess 46 is then removed thereby allowing the entire wheel hub assembly to be axially pulled, without cocking or skewing, straight off of axle 18 simply by pushing or pulling dolly 14 away from axle 18.

Once removed from the axle 18, all repair and replacement procedures may be carried out with the hub assembly 16 supported on support apparatus 10, which in turn is supported throughout the entire removal and replacement process on a suitable dolly or forked lifting machine 14. The socket members 26 are initially positioned over and engaged with forks 12 so as to mount the support apparatus to the dolly 14. Wheel bearing seals and wheel bearings may be repaired and replaced in a known fashion. Brake rotors 48 may also be easily removed from the hub assembly and easily repaired and/or replaced.

The hub assembly may be easily replaced by simply wheeling the support apparatus 10 back to the axle 18 and pushing the hub assembly back onto the axle. No adjustment of support apparatus 10 is necessary to carry out this replacement procedure. The nuts 22 may then be removed from studs 24, the support apparatus removed from the hub assembly 10, and the wheel and tire remounted in a conventional fashion There has been disclosed heretofore the best embodiment of the invention presently contemplated. However, it is to be understood that various changes and modifications may be made thereto without departing from the spirit of the invention.

What is claimed is:

1. An apparatus for supporting a wheel hub on a forked dolly and the like, said wheel hub having a plurality of studs projecting therefrom in a generally circular pattern, said apparatus comprising:

mounting means for mounting said apparatus on said dolly;

support means fixed to said mounting means; and a support member connected to said support means and having a planar engagement surface engagable with said wheel hub, said support member having a plurality of fixed apertures formed through said engagement surface and circumferentially spaced in a fixed pattern defining a generally circular arc for receiving said plurality of studs and for effecting planar contact with said wheel hub.

2. The apparatus of claim 1, wherein said mounting means comprises a pair of lifting fork engagement members.

3. The apparatus of claim 1, wherein said support means comprises a pair of support arms.

4. The apparatus of claim 1, wherein said support member comprises a pair of spaced apart plates.

5. The apparatus of claim 4, wherein said plates are formed as C-shaped plates.

6. The apparatus of claim 1, wherein said support means is pivotally connected to said support member.

7. The apparatus of claim 1, further comprising brace means connected to said mounting means and to said support means for increasing the rigidity of said apparatus.

8. The apparatus of claim 2, wherein said pair of lifting fork engagement members comprises a pair of tubular socket members.

9. The apparatus of claim 5, wherein each of said C-shaped plates comprises a pair of free end portions and wherein a recess is formed in each of said free end portions for engaging a pair of said studs.

10. The apparatus of claim 1, further comprising means for securing said support member to said studs.

11. An apparatus for supporting a wheel hub on a forked dolly and the like, said wheel hub having a plurality of studs projecting therefrom, said apparatus comprising:

mounting means for mounting said apparatus on said dolly;

support means fixed to said mounting means; and a support member comprising a pair of spaced apart plates connected to said support means and engagable with said wheel hub, said plates having a plurality of apertures formed therein for receiving said plurality of studs.

12. The apparatus of claim 11, wherein said plates are formed as C-shaped plates.

13. The apparatus of claim 12, wherein each of said C-shaped plates comprises a pair of free end portions and wherein a recess is formed in each of said free end portions for engaging a pair of said studs.

14. An apparatus for supporting a wheel hub on a forked dolly and the like, said wheel hub having a plurality of studs projecting therefrom in a generally circular pattern, said apparatus comprising:

mounting means for mounting said apparatus on said dolly;

support means fixed to said mounting means; and a support member connected to said support means and engagable with said wheel hub, said support member having a plurality of fixed apertures formed therein and circumferentially spaced along a generally circular arc for receiving said plurality of studs.

* * * * *